US008709168B2

(12) United States Patent
Waite et al.

(10) Patent No.: US 8,709,168 B2
(45) Date of Patent: Apr. 29, 2014

(54) TREATMENT OF HARD SURFACES

(75) Inventors: Alan Geoffrey Waite, Darlington (GB); Trevor Graham Blease, Stockton on Tees (GB); Sean Alexander Robins, Guisborough (GB)

(73) Assignee: Croda International PLC, Goole, North Humberside (GB)

( * ) Notice: Subject to any disclaimer, the term of this patent is extended or adjusted under 35 U.S.C. 154(b) by 0 days.

(21) Appl. No.: 13/504,436

(22) PCT Filed: Oct. 4, 2010

(86) PCT No.: PCT/GB2010/001859
§ 371 (c)(1),
(2), (4) Date: Apr. 26, 2012

(87) PCT Pub. No.: WO2011/051646
PCT Pub. Date: May 5, 2011

(65) Prior Publication Data
US 2012/0208736 A1  Aug. 16, 2012

(30) Foreign Application Priority Data
Oct. 30, 2009  (GB) .................................. 0919097.6

(51) Int. Cl.
*B08B 3/04*  (2006.01)
*C11D 1/00*  (2006.01)
*C11D 1/62*  (2006.01)

(52) U.S. Cl.
USPC ............. 134/25.2; 134/25.3; 134/39; 134/42; 510/237; 510/259; 510/421; 510/499; 510/504

(58) Field of Classification Search
USPC ......... 510/237, 259, 421, 499, 504; 134/25.2, 134/25.3, 39, 42
See application file for complete search history.

(56) References Cited

U.S. PATENT DOCUMENTS 3,907,701 A  *  9/1975  Liebold et al. ................ 516/179
6,703,358 B1  3/2004  Aubay et al.

FOREIGN PATENT DOCUMENTS

| WO | WO97/42288 | 11/1997 | |
| WO | WO2006/108857 | 10/2006 | |
| WO | WO 2006/108857 | * 10/2006 | ............... C11D 3/37 |

OTHER PUBLICATIONS

International Search Report dated Feb. 1, 2011 for PCT/GB2010/001859.

* cited by examiner

*Primary Examiner* — Brian P Mruk
(74) *Attorney, Agent, or Firm* — Jones Day

(57) ABSTRACT

Hard surfaces can be treated to improve soil resistance, particularly resistance to oily soils, by applying a composition of a quaternised, polyamine, polypropoxylate, polyethoxylate. The polyamine can be a polyethyleneimme, desirably having a molecular weight of from 10 to 50 kDa. The average length of the polypropylenoxy chains is desirably from 10 to 100 and the polyethylenoxy chains from 5 to 50 (each per NH group in the polyamine), particularly at a molar ratio of PO:EO of about 3:1. The degree of quaternization of the nitrogen atoms in the polyamine is desirably from 70 to 100%. The polymer will usually be used in solution in water or an aqueous formulation, which may include detergent and other detergent formulation components.

32 Claims, No Drawings

TREATMENT OF HARD SURFACES

CROSS REFERENCE TO RELATED APPLICATION

This application is the National Phase application of International Application No. PCT/GB2010/001859, filed Oct. 4, 2010, which designates the United States and was published in English. The foregoing related application, in its entirety, is incorporated herein by reference.

The present invention relates to polymeric compounds, formulations containing polymeric compounds useful in the treatment of hard surfaces and to methods of treating hard surfaces in particular to improve their soil resistance.

In the context of this invention "soil resistance" is imparting improved soil release properties to surfaces to facilitate subsequent cleaning. In particular, it applies to hard surfaces, notably hard surfaces in domestic and industrial or institutional cleaning (often abbreviated to "I and I cleaning"). It is common experience that oily or greasy soils and/or limescale soils, including soils made substantially completely of mineral deposits, such as alkali metal, particularly calcium and/or magnesium carbonates, and stains which include such mineral deposits combined with other soil such as water insoluble soap salts, such as calcium and/or magnesium stearates, and greasy or oily soils, can be difficult to remove from hard surfaces. In comparison, hydrophilic soils are usually easier to remove with aqueous wash systems. Accordingly it is particularly useful to treat hard surfaces to improve their resistance to oily or greasy soils and/or limescale soils. A further benefit from improving the soil resistance of hard surfaces is that it may reduce the tendency to form water tide marks and/or the tendency to leave streaks especially after rinsing.

The improvement in the soil resistance of substrates, especially hard surfaces, is important in that it reduces the tendency of soil material to adhere to the surfaces, in effect slowing the rate, or reducing the extent, of soiling and/or makes it easier to remove the soil when cleaning the surface, particularly by reducing the mechanical effort required to remove the soil.

It is well known to treat fabrics with soil deposition inhibitors or to include such inhibitors in laundry cleaning products, examples include the "Permalose" PET/PEG copolymer originally from ICI. More recently BASF introduced "Sokolan HP70", crosslinked polyamines for hard surface treatment, believed described in WO 2005/073357 A. Another BASF proposal, WO 2006/108857A, uses modified polyamines with relatively short polyalkoxylate chains with an inner polyethoxylate block and an outer polypropoxylate block—the order said to be important for good performance—a contrast is drawn with polyamines with the reverse alkoxylation sequence described in DE 2227546 A (U.S. Pat. No. 3,907,701) as crude oil demulsifiers. A non-preferred possibility described in WO 2006/108857 A is to quaternise the polyamine of that specification to a limited extent.

Other manufacturers including Rhodia have approached this need by suggesting the use of formulations including copolymers of acrylic esters/amides carrying quaternium, particularly diquaternium, substituents for example as described in U.S. Pat. No. 6,703,358.

This invention is based on our finding that treatment of hard surfaces with quaternised polyamine polymers which have been block propoxylated and then block ethoxylated can give excellent soil resistance, particularly to oily soils, the deposition of limescale and/or tide marks from insoluble soap salts and/or limescale and to streaking from rinsing water. Our experience suggests that propoxylation followed by ethoxylation results in superior performance, at least when quaternised, desirably highly quaternised (see below), polymers are used. We believe that the combination of a high degree of quaternisation of the polyamine and the polypropoxylation makes the polymer substantive to the surfaces being treated and the subsequent polyethoxylation provides a relatively hydrophilic coating which provides or improves soil repellency. We have found that such quaternised polyalkoxylated polyamine polymers can provide soil repellency when applied from formulations over a wide pH range.

The present invention accordingly provides, a method of treating hard surfaces to improve soil resistance, particularly resistance to oily soils, the deposition of limescale and water streaks, which comprises applying to the surface a composition comprising a water soluble quaternised, polyamine, polypropoxylate, polyethoxylate.

The invention includes treatment formulations for hard surfaces comprising, as an agent to improve soil resistance, at least one water soluble quaternised, polyamine, polypropoxylate, polyethoxylate. Such treatment formulations will often be intended to provide cleaning as well as improving soil resistance, and the invention accordingly provides a cleaning formulation comprising at least one detergent surfactant and, as an agent to improve soil resistance, a water soluble quaternised, polyamine, polypropoxylate, polyethoxylate.

The invention includes a method of treating hard surfaces to improve their soil resistance which comprises applying to the hard surface a water soluble quaternised, polyamine, polypropoxylate, polyethoxylate polymer or a formulations including such a polymer. Most commonly such treatment will be carried out at the same time as cleaning the hard surface, usually with the treatment polymer included in a cleaning formulation and accordingly the invention further includes a method of cleaning hard surfaces which comprises applying to the hard surface an aqueous cleaning composition including at least one detergent surfactant and as an agent to improve the soil resistance of the hard surface, a water soluble quaternised, polyamine, polypropoxylate, polyethoxylate polymer.

As applied in cleaning hard surfaces, the invention will usually include the following process steps:
a) applying to a hard surface an aqueous cleaning composition including at least one detergent surfactant and as an agent to improve the soil resistance of the hard surface, a water soluble quaternised, polyamine, polypropoxylate, polyethoxylate polymer, typically by pouring or spraying the composition on the hard surface or by using an application means;
b) simultaneously or subsequently spreading and/or wiping the composition over the hard surface, usually with a fibrous or porous wiping or spreading means; and then
c) optionally removing or rinsing at least part of the liquid, from the hard surface with water and/or a fibrous or porous drying means, some dirt being removed from the hard surface in the rinse water and/or the drying means.

We use the term "hard surface" to refer to non-porous solid surfaces such as those of metals, ceramics, glass, wood and plastics, particularly laminated plastics, all including painted, varnished or sealed surfaces, and can be contrasted with other surfaces, particularly soft and absorbent surfaces such as textiles (cleaned in laundry cleaning) and skin (as in cosmetics, more particularly cosmetic removers). Examples of hard surfaces include: walls, floors, windows, mirrors, doors, tiles and tiled areas, work surfaces, including cutting and chopping boards, domestic fittings e.g. shelves and cupboards, washing and sanitary fixings e.g. sinks, wash basins, baths, showers and WCs, domestic appliances e.g. stoves, ovens, including microwave ovens, washing machines and dryers, dishwashers, refrigerators, freezers and chillers, food preparation machines e.g. mixers, blenders and food processors, in both domestic and institutional and industrial environments, including in hospitals, medical laboratories and medical treatment environments.

For convenience, particularly when discussing how the copolymer is used, the water soluble quaternised, polyamine, polypropoxylate, polyethoxylate copolymer of the invention is referred to as a "soil release copolymer".

The polymers of and used in this invention are described as "water soluble". By this we mean that the polymers are soluble in water and desirably also in aqueous based formulations e.g. detergent formulations, at a concentration to provide sufficient polymer to satisfactorily treat hard surfaces (bearing in mind that such formulations will usually be diluted before application to hard surfaces). It is further desirable that such formulations remain stable during normal storage before use. Typically the polymers will have a water solubility of at least 0.5% and more usually at least 1% by weight. As the aim is for the polymer to coat the hard surfaces to which solutions or formulations containing the polymers are applied, the polymers will desirably not be so hydrophilic or water soluble that they remain in solution and are not substantive to the hard surfaces. However, we have found with the polymers of and used in this invention that even with measured water solubility of up to or even greater than 20% by weight, they remain effectively substantive to hard surfaces.

Polymers which can desirably be used in the invention are also part of the invention which accordingly includes polymers of the general formula (I):

$$R^1[A^1\{(PO)_n(EO)_mH\}_2]_p[A^1(PO)_n(EO)_mH]_q[A^1]_r \qquad (I)$$

where
$R^1$ represents the molecular framework of a quaternised polyamine apart from p+q+r quaternised groups;
each $A^1$ is independently a tertiary N atom; a quaternary group $N^+R^2An^{s-}_{1/s}$ where $R^2$ is a $C_1$ to $C_6$ alkyl, a C2 to C6 alkenyl, or a $C_7$ to $C_{10}$ aralkyl group and An is a charge balancing anion carrying a charge of s-; or a quaternary nitrogen betaine group, particularly of the formula —$N^+R^4COO^-$, where $R^4$ is a hydrocarbylene particularly an alkylene group, more particularly a $C_1$ to $C_6$ alkylene group, especially a —$CH_2$— group;
PO is propyleneoxy;
EO is ethyleneoxy;
n is from 10 to 100;
m is from 5 to 100;
p is the number of alkoxylated/quaternised primary amino groups in the polymer;
q is the number of alkoxylated/quaternised secondary amino groups in the polymer;
r is the number of quaternised tertiary amino groups in the polymer; and
p+q+r is desirably in the range 200 to 1200, particularly 340 to 700, particularly about 580.

Compounds of the formula (I) include three types of groups derived from amino groups in the (theoretical) precursor polyamine which can be described:
groups of the formula: $N^+[(PO)_n(EO)_mR^3]_2$ are derived from primary amino groups in the polyamine by alkoxylation of the two primary amino hydrogen atoms followed by quaternisation of the amino nitrogen atom;
groups of the formula: $N^+(PO)_n(EO)_mR^3$ are derived from secondary amino groups in the polyamine by alkoxylation of the secondary amino hydrogen atom followed by quaternisation of the amino nitrogen atom;
groups of the formula: $N^+R^2An^{s-}_{1/s}$, and —$N^+R^4COO^-$ are derived from tertiary amino groups in the polyamine by oxidation/quaternisation of the amino nitrogen atom;

For simplicity, formula (I) does not show the plural single bonds between secondary and tertiary amino nitrogen atoms and the framework of the polyamine $R^1$.

The polymer of and used in the invention is based on a polyamine which is polyalkoxylated (see further below) and quaternised. Although, in principle a broad range of polyamine polymers may be used, that the desired polymer is polyalkoxylated means the polyamine will include reactive amino (NH) groups, particularly as secondary amino groups, each providing one reactive "NH" group and/or primary amino groups, each providing two reactive "NH" groups. The amino groups may be pendent to the main chain of the polymer or may or form part of the polymeric chain.

The polyamine desirably has a relatively high molecular weight, typically above 10 kiloDaltons (KDa), and particularly also a relatively high proportion of reactive amino groups (which can be alkoxylated). Both these features can be provided by polyalkyleneimines, particularly polyethyleneimine (PEI), which is especially useful as it is readily available and relatively inexpensive and offers a high proportion of nitrogen atoms (for quaternisation) and reactive amino groups. Polyalkyleneimines, particularly polyethyleneimines, which can be used to make the copolymers of and used in this invention will typically contain:
i "linear" alkyleneimine repeat units typically of the formula: —NHCH2CH2-;
ii "terminal" primary amino containing groups typically of the formula: NH2-CH2CH2-;
and for polyethyleneimines including branching:
ii "branching" groups that can be modelled by the formula N(CH2CH2-)3 (this is not a formal 'repeat' unit).

Commonly, in particular in polyethyleneimines with a molecular weight above 500, these "linear", "terminal" and "branching" groups are present in approximately equal molar proportions.

The polyamine desirably includes on average at least one reactive NH group per 100 Da, particularly at least one per 75 Da, and especially at least one per 50 Da. PEI has a nominal repeat unit of —$NHCH_2CH_2$— corresponding to one active hydrogen atom per 43 Da. In practice branching complicates the picture, but in commercially available PEIs each branch in the molecule acts as the root of a fresh chain end, so that typically the number of reactive NH groups (noting that each terminal —$NH_2$ group corresponds to two reactive NH groups) remains approximately equal to the number of alkyleneimine repeat units in the polymer. In commercially available polyalkyleneimines, particularly polyethyleneimines, of the molecular weight typically used in this invention it is common that there are approximately equal numbers of primary and tertiary amino groups.

Desirably the polyamine will have a molecular weight of at least 10 k Daltons and commercially polyamines, particularly PEIs, are available with molecular weights up to about 50 kDa. Within this range the molecular weight is desirably from 15 to 30 kDa, particularly about 25 kDa. For polyethyleneimines these molecular weight ranges correspond to total numbers of primary secondary and tertiary amino-groups, p+q+r in formula (I), approximately corresponding to numbers of reactive NH groups, of from about 200 to about 1200, desirably about 340 to about 700, particularly about 580. Typically p, q and r are approximately equal.

The group $R^1$ represents the molecular framework of the polyamine starting material but disregarding the amino groups which are alkoxylated and (at least partially) quaternised. Where the polyamine is has many or most of its nitrogen atoms forming part of the polymer chains as in polyalkyleneimines, particularly PEI, the "framework" in $R^1$ will appears discontinuous.

The polyamine is polyalkoxylated, specifically by being first block polypropoxylated and then block polyethoxylated. Generally, the degree of alkoxylation is such that substantially all the primary and secondary amino groups in the polyamine will be (poly)alkoxylated. However, in particularly branched polyamines a few, but usually only a very few, amino groups may be so sterically hindered as to be unreactive and can be regarded as part of the core polyamine framework. The polypropylenoxy and polyethylenoxy chain segments are block segments, however, in practice it is likely that there will be unreacted propylene oxide in the reaction system at the point that ethylene oxide is introduced and this is likely to give rise to a so-called taper block copolymer chain. Typically the length of the polypropyleneoxy chain segments is from 10 to 100, particularly from 20 to 70, especially from 25 to 50, propyleneoxy units. Typically the length of the polyethylenoxy chain segments is from 5 to 50, particularly from 5 to 30, especially from 5 to 20, ethyleneoxy units. The polypropoxylated and polyethoxylated blocks may contain minor proportions of other alkylenoxy groups. In particular, the polypropoxylated block may include minor proportions of ethyleneoxy and/or butyleneoxy groups and the polyethoxylated block may include minor proportions of propyleneoxy groups. The minor proportion of such other alkylenoxy units is unlikely to be more than 10 mol % and will usually be not more than 5 mol % of the total alkylenoxy groups in the respective block(s). This is apart from the mixing of ethylene and propylene groups in the taper portion of taper block copolymer chains.

We have found that polymers having a molar ratio of PO units to EO units of at least 1:1, particularly at least 2:1 and desirably not more than 5:1, particularly not more than 4:1, and particularly desirably about 3:1 give better performance in hard surface soil resistance and that accordingly ratios within such ranges are preferred.

The alkoxylated polyamine polymer is quaternised before use in treating hard surfaces. This increases the water solubility of the polymers and appears to improve the substantivity of the polymer to typical hard surfaces. Generally a minimum of 25%, more usually at least 35%, desirably at least 50%, in particular at least 75%, more usually at least 80% desirably at least 90% e.g. about 95% of the polyamine amino groups are quaternised. In principle even higher percentages of quaternisation may be desirable e.g. up to 100% (or as near as is practical), but may in practice require the use of excess quaternisation reagent (otherwise undesirable as such because typical quaternising reagents are hazardous).

It is desirable that both the PO:EC) ratio is close to the optimum e.g. in the range 2:1 to 4:1 particularly about 3:1, and that the polymer is at least relatively highly quaternised e.g. at least 35%, particularly at least 70%, especially at least 90% and desirably as near 100% as is practical, of the polyamine amino groups are quaternised.

The quaternising group [$R^2$ in formula (I)] is typically a lower alk(en)yl group, more usually a lower alkyl group typically a $C_1$ to $C_6$, particularly $C_1$ to $C_4$, alkyl, especially methyl or ethyl group.

The quaternary amino groups will have an associated counter anion [$An^x$ in the definitions for formula (I)], which will commonly be a residue of the quaternising agent. Common such ions include halide, particularly chloride e.g. as derived from alkyl (commonly methyl) halide (commonly chloride) quaternising agents; and sulphate or alkyl (commonly methyl) sulphate e.g. as derived from alkyl (commonly methyl) sulphate quaternising agents. In betaine derivatives, the counter ion is provided by the acidic, usually carboxylate, group of the betaine.

Overall the polymers of and used in the invention typically have molecular weights of at least 100 kDa, more usually at least 250 kDa, desirably at least 500 kDa, and particularly at least 1 MDa, but typically not more than 3 MDa, more usually not more than 2 MDa, and desirably not more that about 1.75 MDa. We have found that particularly useful polymers have molecular weights of from 500 kDa to 2 MDa, particularly 750 kDa to 1.75 MDa e.g. from about 1.25 to about 1.6 MDa.

The polymers of and used in the present invention can be made by generally known synthetic procedures. In particular we envisage a general reaction scheme in which:

i) a polyamine is reacted with propylene oxide (PO) to give an intermediate in which the NH groups are generally monopropoxylated; followed by ii) further reaction of the intermediate from phase i) with PO to form a polypropoxylated intermediate; followed by iii) further reaction of the intermediate from phase ii) with EO to produce a polypropoxylated, polyethoxylated intermediate polymer; and subsequently iv) reacting the intermediate from phase iii) with a quaternising reagent to form the quaternised polypropoxylated, polyethoxylated product polymer.

In phase i) the initial propoxylation is generally at a molar ratio of PO:available NH of about 1:1 and typically does not use added catalyst, to give a generally monopropoxylated (based on available NH groups) intermediate. The subsequent polypropoxylation and polyethoxylation will typically be catalysed, usually base catalysed, typically using added strong base, generally alkali metal hydroxide such as NaOH or KOH, followed by distilling off water to generate alkoxide ions from the monopropoxylated initial intermediate, or adding alkoxide, usually alkali metal lower alkyl (particularly $C_1$ to $C_4$) alkoxide, especially methoxide or ethoxide, followed by distilling off the relevant lower alcohol. As those skilled in the art will appreciate, the relatively large overall degree of alkoxylation, and thus the large increase in product mass as compared with the starting polyamine polymer, makes it likely that the overall alkoxylation will be carried out in at least two stages, but the division(s) between the stages need not coincide with the change over from the block PO to block EO polyalkylation. Typically the initial monopropoxylation of the reactive NH groups and at least part of the polypropoxylation will be carried out in one stage with possible further polypropoxylation and polyethoxylation carried out in a second and/or subsequent stage. In practice, it is likely that fresh catalyst will need to be added for the second and any subsequent such reaction stages. At the end of the polyalkoxylation, the catalyst will typically be neutralised with acid such as acetic acid.

The generally tertiary amine groups in the fully polyalkoxylated intermediate polymer are subsequently quaternised, typically by treating the polyalkoxylated polyamine copolymer intermediate with an alkylating agent such as an alkyl halide or dialkyl sulphate to form a quaternary amine group; or by reaction with a halo-carboxylic acid, particularly a chloro-carboxylic acid, usually an α-halo acid, such as α-chloracetic acid to form a betaine. Typically this reaction will be carried out using neat reagents, under ambient pressure, at a moderately superambient temperature particularly from 30 to 100° C., e.g. about 60° C., and usually without needing a catalyst.

The soil release copolymer will typically be used to treat hard surfaces as a solution in an aqueous medium. Typically the soil release copolymer will comprise at least 0.1% more usually at least 0.25%, and usually the concentration will not be greater than 2%, more usually not be more than 1.25%, and desirably not be more than 0.75%, all percentages being by weight of the solution.

The formulation containing the soil release copolymer may be used solely or mainly to provide treatment of the hard surfaces to provide improves soil resistance and this type of formulation will typically be formulated in water and contain the soil release copolymer and may in addition include surfactants such as wetter(s), sequestrant(s) to soften the water used to dilute the concentrate to use concentrations, and fragrance and colour materials.

Typically such formulations will be made up as concentrate and diluted before use. The proportions of the components of concentrates and corresponding use concentrations are typically:

| Material | Concentrate (wt %) | For Use (wt %) |
|---|---|---|
| soil release copolymer | 5 to 25 | 0.25 to 1.25 |
| wetter (when used) | 5 to 60 | 0.25 to 3 |
| sequestrant (when used) | 2 to 50 | 0.1 to 5 |
| fragrance and colour (when used) | 2 to 40 | 0.1 to 2 |
| water | to 100 | |

When applied separately, the treatment will usually be applied to hard surfaces that are clean or have been separately cleaned.

The soil release copolymer may also be in formulations used mainly for other purposes such as cleaning formulations, and typical compositions of such formulations are described below. In formulations such as cleaning compositions including soil release copolymer, other components can include surfactant [though generally not anionic surfactant as these are incompatible with the generally cationic quaternary amine polymers] including detergents, welters and/or dispersants; soil suspending agents and/or anti-redeposition agents; dye transfer agents and/or dye transfer inhibitors; enzymes; bleaches optionally with bleach activators; hydrotropes; builders; sequestrants (chelating agents); pH adjustment and/or buffering agents; solids such as mild abrasives; corrosion inhibitors; anti-foams; stabilisers; preservatives, particularly biocides such as anti-microbials; radical scavengers; perfume; anti dusting agents; optical brighteners; silicones; dye/pigment; all typically at conventional levels.

A typical generic cleaning formulation will typically include the following proportions of materials:

| Material | Concentrate wt % | Use wt % |
|---|---|---|
| soil release copolymer | 2 to 20 | 0.25 to 1.5 |
| nonionic surfactant | 20 to 40 | 2 to 30 |
| builder | 0 (10) to 50 | 0 (0.5) to 15 |
| sequestrant | 0 (10) to 30 | 0 (0.5) to 15 |
| hydrotrope | 0 (5) to 20 | 0 (0.5) to 5 |
| solvent | 0 (20) to 60 | 0 (1) to 30 |
| polymer | 0 (2) to 10 | 0 (0.1) to 5 |
| alkali/acid | 0 (1) to 20 | 0 (0.1) to 10 |
| bleach | 0 (5) to 30 | 0 (0.5) to 15 |
| fragrance, colour etc | 0 (1) to 5 | 0.1 to 2 |
| water | to 100 | to 100 |

Within the broad range of cleaning formulations specific examples formulated for use include:

All Purpose Cleaner

| Material | Example | wt % |
|---|---|---|
| soil release copolymer | | 0.25 to 1.5 |
| nonionic surfactant | alcohol ethoxylate | 2 to 30 |
| solvent | i-propyl or benzyl alcohol, glycol ether, limonene, pine oil | 1 to 30 |
| builder/sequestrant | carbonate, silicate, citrate, phosphate, EDTA/NTA | 0 (0.5) to 15 |
| polymer | polyacrylate, PVP | 0 (0.1) to 5 |
| alkali/acid | NaOH, NH$_3$, ethanolamine/HCl | 0 (0.1) to 5 |
| hydrotrope | xylene or cumene sulfonate, p-TSA | 0 (0.5) to 5 |
| fragrance, colour etc | | 0.1 to 2 |
| water | | to 100 |

Liquid Household Cleaner

| Material | Example | wt % |
|---|---|---|
| soil release copolymer | | 0.25 to 1.5 |
| nonionic surfactant | amine oxide | 2 to 20 |
| bleach | hypochlorite | 0 (0.5) to 15 |
| builder | carbonate, silicate | 0 (0.5) to 15 |
| alkali | NaOH | 0 (0.1) to 5 |
| hydrotrope | xylene/cumene sulfonate | 0 (0.5) to 5 |
| fragrance, colour etc | | 0.1 to 2 |
| water | | to 100 |

Bathroom Cleaner

| Material | Example | wt % |
|---|---|---|
| soil release copolymer | | 0.25 to 1.5 |
| nonionic surfactant | alcohol EOn | 2 to 20 |
| solvent | IPA, benzyl OH glycol ether, limonene pine oil | 1 to 30 |
| builder/sequestrant | carbonate, phosphonate, EDTA/NTA | 0 (0.5) to 15 |
| polymer | polyacrylate, PVP | 0 (0.1) to 5 |
| acid | citric, glutaric, succinic, HCl, H$_2$SO$_4$, H$_3$PO$_4$ | 0 (0.1) to 10 |
| fragrance, colour etc | | 0.1 to 2 |
| water | | to 100 |

Glass Cleaner

| Material | Example | wt % |
|---|---|---|
| soil release copolymer | | 0.25 to 1.5 |
| nonionic surfactant | alcohol EOn | 2 to 15 |
| solvent | ethanol, IPA, glycol ether | 3 to 20 |
| builder/buffer | silicate, carbonate, ammonia, ethanolamine | 0 (0.5) to 1 |

| Material | Example | wt % |
|---|---|---|
| polymer | polyacrylate, PVP | 0 (0.1) to 5 |
| fragrance, colour etc | | 0.1 to 2 |
| water | | to 100 |

Acidic Toilet Bowl Cleaner

| Material | Example | wt % |
|---|---|---|
| soil release copolymer | | 0.25 to 1.5 |
| nonionic surfactant | alcohol EOn | 2 to 10 |
| acid | citric, glutaric, succinic, HCl, $H_2SO_4$, $H_3PO_4$ | 0 (0.1) to 10 |
| bleach | monopersulphate, peracetic, H2O2 | 0 (0.5) to 15 |
| fragrance, colour etc | | 0.1 to 2 |
| water | | to 100 |

In the above tables, amounts in brackets indicate typical lower limits for each material when present in the formulation.

The formulations of the invention will typically be made up as concentrates and will be diluted, typically with 10 to 400, more usually from 10 to 200 and particularly from 10 to 100 times the formulation weight of water. Dilution will usually occur immediately prior to application of the formulation to the hard surface substrate to be cleaned. It may be applied directly to the surface to be cleaned by pouring and/or spraying or by application e.g. using a mop, cloth or brush. The invention accordingly includes a treatment method of the invention which comprises an additional step of diluting the formulation with an appropriate diluent, particularly water, before applying the formulation in diluted form to the hard surface to be treated. More uniform application of the formulation over the hard surface may be effected by wiping the surface with a cloth or mop.

Of course, it is possible to separately dilute and then mix or mix and then dilute separate treatment and cleaning formulations e.g. as when the cleaning formulation and treatment formulation (containing the soil release copolymer) are not compatible in long term storage or otherwise need to be separately formulated.

Although the copolymer will usually be used as part of a cleaning operation it may be applied separately, desirably suitably diluted, to a surface, particularly a clean surface, in order to treat the surface to improve its subsequent soil resistance. In this case some of the diluted formulation will be left to dry on the surface and the surface will not usually be rinsed after treatment. In such cleaning operations, part of the formulation will be removed from the hard surface along with soil removed from the surface, but desirably part of the formulation will be left to dry on the surface to enhance treatment of the surface with the quaternised copolymer. The surface may be suitably rinsed after cleaning, even though this may remove some of the copolymer form the hard surface.

The soil release copolymers of and used in this invention have the benefit that they can be used in formulations over a wide pH range, acidic, alkaline or neutral. In this they are superior to currently available materials which are active either in acid or alkali formulations but not both. The pH of formulations containing the soil release copolymer of the invention may be from 2 to 12, particularly from 2 to 10 covering from acidic toilet bowl cleaners to alkaline multi-purpose cleaners.

The following Examples illustrate the invention. All parts and percentages are by weight unless otherwise specified.

Materials

PEI1 polyethyleneimine MW ca 25 kDa, Lupasol WF ex BASF

SYNTHESIS EXAMPLES

Synthesis Example SE1

Polyethyleneimine PEI1 was propoxylated and ethoxylated (in two stages to accommodate the build in the vessels used) and then quaternised as described below.

PEI1 [360 g; 18 mmol(PEI); 8.37 mol(NH)] was weighed into a stirred reactor fitted with a vacuum line with liquid and vapour traps, deaerated, heated to 120° C. and the PEI1 vacuum stripped at ca 0.2 bar (20 kPa) for 1 hour. Propylene oxide (PO) (490 g; 8.45 mol; ca 1 mol per mol NH) was added over a period of 2 hours; the reaction mixture held at 120° C. for a further 2 hours; and then cooled to 90° C. $NaOCH_3$ (14 g) was added and methanol (probably with a trace of water) was vacuum stripped for 30 minutes at 90° C. followed by 1 hr at 120° C. at ca 0.2 bar (20 kPa). The reaction vessel was then pressurised to 1.2 bar (120 kPa) with dry nitrogen, heated to 140° C. and PO (6480 g; 111.7 mol; ca 13.3 mol per mol NH) added over 16 hrs; held at 140° C. for a further 2 hrs to complete reaction and then cooled.

2400 g (containing ca 2.7 mol (NH)) of this intermediate was placed in a stirred reactor fitted with a vacuum line with liquid and vapour traps, deaerated. $NaOCH_3$ (15 g) was added, the mixture was heated to 110° C., vacuum stripped ca 0.2 bar (20 kPa) for 90 minutes; heated to 130° C. and pressurised to 1.2 bar (120 kPa) with nitrogen. PO (2600 g; 44.8 mol; a further 16.7 mol PO per mol(NH) in PEI) was added over 5 hours; the reaction mixture was maintained at 130° C. for a further 2 hrs, heated to 140° C. for a further hour; then heated to 150° C. and the pressure increased to 3.4 bar (340 kPa) with nitrogen. EO (1250 g; 28.4 mol; 10 mol EO per mol(NH) in PEI) was gradually added over 4 hours and the mixture maintained at 150° C. for a further 1 hour; cooled to 75° C.; acetic acid (36 g 80% w/w aqueous solution) added (to neutralise the methoxide catalyst?), the reaction mixture stirred for 30 minutes at 75° C. and the ca 30-propoxylated and 10-ethoxylated PEI polymer was then discharged.

Propoxylated and ethoxylated PEI polymer prepared as described above (300 g; ca 0.3 mmol; containing ca 0.14 mol (NH)) was weighed into a 500 ml flask fitted for distillation; heated to 50° C. and vacuum stripped at ca 5 mbar (500 Pa) for 30 minutes; cooled to 40° C. and the vacuum released. Dimethyl sulphate (DMS) (16.4 g; 0.13 mol; calculated as ca 99% of the theoretical requirement for complete quaternisation of all the amino groups in the polymer) was slowly added from a dropping funnel over 10 minutes. A small exotherm was noted, the temperature rose to ca 43° C.; and the mixture was held (at ca 40° C.) for 3 hours. Subsequently NaOH (50% aqueous solution; 0.9 g mol) was added to the reaction mixture to ensure hydrolysis of any residual DMS; the reaction was heated for a further 1.5 hours at 45° C. under agitation and then discharged.

Synthesis Examples SE2 to SE7

The polymers were made by the general method described in Synthesis Example SE1 but varying the nature or amount of the materials used to obtain the polymers SE2 to SE7 as summarised in Table SE1 below.

TABLE SE1

| Ex No | Polyamine | PO (mol)[1] | EO (mol)[1] | MW[2] (MDa) | % quat[3] |
|---|---|---|---|---|---|
| SE1 | PEI1 | 30 | 10 | 1.36 | 99 |
| SE2 | PEI1 | 30 | 10 | 1.36 | 73 |
| SE3 | PEI1 | 40 | 8 | 1.61 | 73 |
| SE4 | PEI1 | 20 | 20 | 1.25 | 73 |
| SE5 | PEI1 | 30 | 15 | 1.46 | 42 |
| SE6 | PEI1 | 30 | 15 | 1.46 | 105 |
| SE7 | PEI1 | 20 | 20 | 1.25 | 105 |

[1] approximate moles per amino hydrogen in PEI
[2] calculated MW based on reagents used
[3] based on the amount of quaternising agent used

APPLICATION EXAMPLES

Materials used in Applications Examples

The products of the Synthesis Examples are referred to by the corresponding SE no
Comp1 Mirapol Surf S-210 soil inhibitor (for alkali formulations) ex Rhodia [for reference in tests]
Comp2 Mirapol Surf S-500 soil inhibitor (for acid formulations) ex Rhodia [for reference in tests]
Cleaning Formulations (Abbreviated Form in Tables)
Clean1—Shower Cleaning Formulation—(Emulating Current Commercial Products)

| Material | wt % |
|---|---|
| alkyl polyglycoside (Glucopon 425N ex Cognis) | 5 |
| water | to 100 | pH adjusted to 5.5 with 85% lactic acid

Clean2—Non-Ionic Shower Clean Formulation

| Material | wt % |
|---|---|
| $C_{9/11}$ alcohol 5EO (Synperonic 91/5 ex Croda) | 1 (non-ionic) |
| water | to 100 | pH measured as 5.0

Clean3—Bleach-Free Toilet Bowl Cleaner (TBC) Formulation—(Emulating Current Commercial Products)

| Material | wt % |
|---|---|
| $C_{9/11}$ alcohol 5EO (Synperonic 91/5 ex Croda) | 1 |
| citric acid | 4 |
| water | to 100 | pH measured as 2.5

Clean4—Multi-Surface Cleaning Formulation—(Emulating Current Commercial Products)

| Material | wt % |
|---|---|
| $C_{9/11}$ alcohol 5EO (Synperonic 91/5 ex Croda) | 9 |
| sodium xylene sulphonate (40% active) | 4.25 |
| sodium carbonate | 1 |
| ethylene diamine tetraacetic acid (EDTA) (tetra sodium salt) | 0.2 |
| water | to 100 | pH measured as 10.3

As used in the tests various levels—between 0.1% and 1.25% by weight of soil release copolymer were added to the above formulations.
Test Substrates
Slides—new 7.6×2.6 cm transparent slides of glass (Slide1), polyacrylate (Slide2), or polycarbonate (Slide3).
Tiles—15×15 cm blue gloss, tile1, and black matt finish, tile2, tiles. Before testing the tiles were washed with warm water and detergent and then rinsed with acetone and dried.
Metal strips of aluminium (300×100 mm) divided into 3 segments with adhesive tape, MS1, and polished steel strip (150×75 mm) divided into 2 segments with adhesive tape, MS2.
Application Testing Methods
Limescale Repellency (Transparent Surfaces).

Solutions of soil release copolymer for testing were prepared in demineralised water and test cleaning formulations described above at 0.1, 0.5 and 1% w/w active polymer Additive. Duplicated test slides were immersed in the aqueous solutions, with similar slides immersed in demineralised water and a formulation blank, for at least one hour. The slides were removed, drained and immediately immersed horizontally in a Petri dish containing 50 ml of fresh (cloudy) 1000 ppm $Ca(HCO_3)_2$ solution and left overnight. The slides were then removed, rinsed by discharging a pipette of demineralised water (ca 2 ml) across both the front and back of the slide and then left to dry. The % transmission of each slide in was measured in a spectrophotometer (Jenway 6300) at 403 nm at 3 points across the surface and the average % transmission reported.
Ceramic Toilet Soil Repellency Using samples of tile1 and tile2, each tile was divided into two with a thin strip of adhesive tape. 1.25 wt % solutions of the active soil release copolymer were made up in the clean3 formulation. 1.0 ml of the test solution was applied to and evenly spread over one half of each tile, using a plastic pasteur pipette. The other half of the tile was similarly treated using a TBC blank formulation (not including the treatment polymer), or a similar solution of Comp2 comparative material. The tile was then allowed to dry horizontally, under ambient conditions for 30 mins; then rinsed by immersion for 5 seconds in a 40 mm deep stainless steel tray filled with ca. 800 ml fresh tap water; and then allowed to dry vertically for 1 hour under ambient conditions.

About 1 ml of a soil slurry, a well mixed 30% w/w dispersion of smooth peanut butter (ex Asda Stores) in demineralised water, was pippetted onto each half of the tile under a Zehnter applicator bar, set at 30 µm, and the applicator drawn down over the tile. The tile was then allowed to dry horizontally under ambient conditions for 3 to 4 hours; rinsed using a pipette-ended hose attached to a tap at a flow rate of 0.45 l.min$^{-1}$ directed from side to side across the tile for 2 mins; and then allowed to dry horizontally under ambient conditions overnight. Gloss measurements were made with a Sheen TriGlossMaster meter at the 20° setting as the average at three locations across the face of each half of the tile. Each test was duplicated and the average result recorded.

Multi-Surface (Ceramic and Metal) Soil Repellency.

Using samples of tile1, tile2, MS1 and MS2, substrates were used to test for soil repellency in a multi-surface cleaner formulation using the same protocol as for Ceramic Toilet Soil Repellency.

APPLICATION EXAMPLE AE1 TO AE8

Various of the quaternised alkoxylated polyamine polymers of Synthesis Examples SE1 to SE7 were tested as described above and the results are set out in Tables AE1 and AE2 below.

TABLE AE1

Limescale repellency

| | Modifier | | | % Transmission | | |
|---|---|---|---|---|---|---|
| Ex No | Form | Type | % | Slide 1 | Slide 2 | Slide 3 |
| AE1.1 | Clean1 | SE1 | 0.1 | 99.3 | 81.8 | 70.9 |
| AE1.2 | | | 1 | 100.0 | 57.2 | 37.4 |
| AE1C.1 | Clean1 | Comp2 | 0.1 | 95.1 | 92.0 | 76.2 |
| AE1C.2 | | | 1 | 97.2 | 61.2 | 69.2 |
| AE2.1 | Clean2 | SE1 | 0.1 | 96.4 | 65.8 | 60.1 |
| AE2.2 | | | 1 | 99.2 | 85.5 | 58.6 |
| AE2C.1 | Clean2 | Comp2 | 0.1 | 90.4 | 55.5 | 34.9 |
| AE2C.2 | | | 1 | 97.3 | 82.4 | 51.7 |
| AE3.1 | Clean2 | SE6 | 0.1 | 92.2 | 69.6 | 55.7 |
| AE3.2 | | | 1 | 96.4 | 70.9 | 64.9 |
| AE3C.1 | Clean2 | Comp2 | 0.1 | 93.9 | 55.5 | 34.9 |
| AE3C.2 | | | 1 | 97.3 | 82.4 | 51.7 |
| AE4.1 | Clean2 | SE7 | 0.1 | 84.2 | 51.0 | 43.2 |
| AE4.2 | | | 1 | 91.3 | 58.6 | 47.2 |
| AE4C.1 | Clean2 | Comp2 | 0.1 | 93.9 | 55.5 | 34.9 |
| AE4C.2 | | | 1 | 97.3 | 82.4 | 51.7 |

TABLE AE2

Soil repellency - test on Ceramics

| | Additive | | | Gloss Units | |
|---|---|---|---|---|---|
| Ex No | Form | Type | % | Tile 1 | Tile 2 |
| AE5.1 | Clean3 | SE1 | 0.1 | 53.5 | — |
| AE5.2 | | | 0.5 | 67.7 | — |
| AE5.3 | | | 1 | 66.8 | — |
| AE5.4 | | | 1.25 | — | 1.95 |
| AE5C.1 | | Comp2 | 0.1 | 51.4 | — |
| AE5C.2 | | | 0.5 | 65.3 | — |
| AE5C3 | | | 1 | 49.3 | — |
| AE5C.4 | | | 1.25 | — | 0.95 |
| AE6.1 | Clean3 | SE6 | 0.1 | 65.0 | 1.10 |
| AE6.2 | | | 0.5 | 67.5 | 1.54 |
| AE6.3 | | | 1 | 68.0 | 1.95 |
| AE6C.1 | | Comp2 | 0.1 | 69.2 | 1.32 |
| AE6C.2 | | | 0.5 | 72.4 | 1.58 |
| AE6C.3 | | | 1 | 70.4 | 1.87 |

TABLE AE3

Soil repellency - Multisurface test

| | Additive | | | Gloss Units | | | |
|---|---|---|---|---|---|---|---|
| Ex No | Form | Type | % | Tile 1 | Tile 2 | MS1 | MS2 |
| AE7 | Clean4 | SE1 | 1.25 | 77.7 | 1.65 | 91.6 | 25.4 |
| AE7C | Clean4 | Comp1 | 1.25 | 47.9 | 1.50 | 76.0 | 22.1 |
| AE8 | Clean4 | SE6 | 1.25 | 68.3 | 1.92 | 102.4 | 24.7 |
| AE8C | Clean4 | Comp1 | 1.25 | 55.6 | 1.49 | 97.6 | 38.5 |

The invention claimed is:

1. A method of improving soil resistance of a hard surface, comprising:
   applying to the hard surface a composition comprising a polymer of Formula (I):

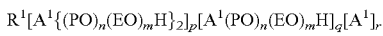

$$R^1[A^1\{(PO)_n(EO)_mH\}_2]_p[A^1(PO)_n(EO)_mH]_q[A^1]_r \quad (I)$$

wherein
   $R^1$ represents the molecular framework of a quaternized polyamine apart from p+q+r quaternized groups;
   $A^1$ independently represents a tertiary N atom; a quaternary group $N^+R^2An^{s-}_{1/s}$ wherein $R^2$ represents a $C_1$ to $C_6$ alkyl or a $C_7$ to $C_{10}$ aralkyl group and An represents a charge balancing anion carrying a charge of s-; or a quaternary nitrogen betaine group;
   PO represents propyleneoxy;
   EO represents ethyleneoxy;
   n represents a value from 10 to 100;
   m represents a value from 5 to 100;
   p represents the number of alkoxylated/quaternized primary amino groups in the polymer;
   q represents the number of alkoxylated/quaternized secondary amino groups in the polymer;
   r represents the number of quaternized tertiary amino groups in the polymer; and
   p+q+r represents a value in the range 200 to 1200.

2. The method of claim 1, wherein the composition comprises the polymer of Formula (I) is dissolved in water.

3. The method of claim 2, wherein the polymer of Formula (I) is present at a concentration of from 0.1 to 1.25 wt. % by weight based on the total formulation.

4. The method of claim 1, wherein the composition is exclusive of detergent surfactant.

5. The method of claim 1, wherein the composition contains detergent surfactant.

6. The method of claim 5, wherein the composition comprises from 2 to 30 wt. % by weight based on the total formulation of nonionic detergent surfactant.

7. The method of claim 1, wherein the composition additionally comprises one or more of the following components:
   detergent builder; wetters and/or dispersants; soil suspending agents and/or anti-redeposition agents; dye transfer agents and/or dye transfer inhibitors; enzymes; bleaches optionally with bleach activators; hydrotropes; sequestrants or chelating agents; pH adjustment and/or buffering agents; as mild abrasives; corrosion inhibitors; antifoams; stabilizers; preservatives; radical scavengers; perfume; anti dusting agents; optical brighteners; silicones; and dye/pigment.

8. The method of claim 7, wherein the composition comprises at least one of:
   detergent builder in an amount of from 0.5 to 15 wt. %;
   sequestrant in an amount of from 0.5 to 5 wt. %;
   hydrotrope in an amount of from 0.5 to 5 wt. %;
   solvent in an amount of from 1 to 30 wt. %;
   polymer in an amount of from 0.1 to 5 wt. %;
   alkali/acid in an amount of from 0.1 to 10 wt. %;
   bleach in an amount of from 0.5 to 15 wt. %;
   fragrance and/or color in an amount of from 0.1 to 2 wt. %;
   wherein all percentages being by weight based on the total formulation.

9. The method of claim 1, wherein the method improves soil resistance to oily soils.

10. The method of claim 1, wherein the $A^1$ is a quaternary nitrogen betaine group comprising the formula $—N^+R^4COO—$, wherein $R^4$ is a hydrocarbylene group.

11. The method of claim 10, wherein the hydrocarbylene group is an alkylene group.

12. The method of claim 10, wherein the hydrocarbylene group is a $C_1$ to $C_6$ alkylene group.

13. The method of claim 10, wherein the hydrocarbylene group is a $CH_2$ group.

14. The method of claim 1, wherein the p+q+r represents a value in the range of 340 to 700.

15. A hard surface treatment formulation, comprising a soil resistance-improving agent comprising:
i) at least one water soluble polymer of Formula (I):

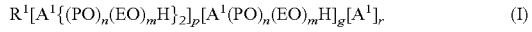

wherein
$R^1$ represents the molecular framework of a quaternized polyamine apart from p+q+r quaternized groups;
$A^1$ independently represents a tertiary N atom; a quaternary group $N^+R^2An^{s-}_{1/s}$ wherein $R^2$ represents a $C_1$ to $C_6$ alkyl or a $C_7$ to $C_{10}$ aralkyl group and An represents a charge balancing anion carrying a charge of s−; or a quaternary nitrogen betaine group;
PO represents propyleneoxy;
EO represents ethyleneoxy;
n represents a value from 10 to 100;
m represents a value from 5 to 100;
p represents the number of alkoxylated/quaternized primary amino groups in the polymer;
q represents the number of alkoxylated/quaternized secondary amino groups in the polymer;
r represents the number of quaternized tertiary amino groups in the polymer; and
p+q+r represents a value in the range of 200 to 700; and
ii) at least one detergent surfactant.

16. The formulation of claim 15, wherein the at least one water soluble polymer of Formula (I) is dissolved in water.

17. The formulation of claim 16, wherein the polymer of Formula (I) is present at a concentration of from 0.1 to 1.25 wt. % based on the total formulation.

18. The formulation of claim 16, wherein the formulation comprises from 2 to 30 wt. % based on the total formulation of nonionic detergent surfactant.

19. The formulation of claim 15, wherein the formulation further comprises one or more of the following components: detergent builder; wetters and/or dispersants; soil suspending agents and/or anti-redeposition agents; dye transfer agents and/or dye transfer inhibitors; enzymes; bleaches optionally with bleach activators; hydrotropes; sequestrants or chelating agents; pH adjustment and/or buffering agents; as mild abrasives; corrosion inhibitors; antifoams; stabilizers; preservatives; radical scavengers; perfume; anti dusting agents; optical brighteners; silicones; and dye/pigment.

20. The formulation of claim 18, wherein the formulation comprises at least one of:
detergent builder in an amount of from 0.5 to 15 wt. %;
sequestrant in an amount of from 0.5 to 15 wt. %;
hydrotrope in an amount of from 1 to 5 wt. %;
solvent in an amount of from 1 to 30 wt. %;
polymer in an amount of from 0.1 to 5 wt. %;
alkali/acid in an amount of from 0.1 to 10 wt. %;
bleach in an amount of from 0.5 to 15 wt. %;
fragrance and/or color in an amount of from 0.1 to 2 wt. %;
all percentages being by weight based on the total formulation.

21. The formulation of claim 19, wherein the preservatives are selected from biocides and antimicrobials.

22. The formulation of claim 15, wherein the polymer has an average of at least one reactive NH group per 75 Da of molecular weight.

23. The formulation of claim 15, wherein p+q+r represents a value in the range of 340 to 700.

24. The formulation of claim 15, wherein the molar ratio of polypropylenoxy groups to polyoxyethylene groups (m to n) is from 1:1 to 5:1.

25. The formulation of claim 15, wherein the degree of quaternization is at least 35%.

26. The formulation of claim 15, wherein the group $R^2$ is a $C_1$ to $C_6$.

27. The formulation of claim 15, wherein the group $An^-$ is a halide.

28. The formulation of claim 15, wherein the polymer has a molecular weight of from 250 kDa to 3 MDa.

29. The formulation of claim 15, wherein the $A^1$ is a quaternary nitrogen betaine group comprising the formula $-N^+R^4COO-$, wherein $R^4$ is a hydrocarbylene group.

30. The formulation of claim 29, wherein the hydrocarbylene group is an alkylene group.

31. The formulation of claim 29, wherein the hydrocarbylene group is a $C_1$ to $C_6$ alkylene group.

32. The formulation of claim 29, wherein the hydrocarbylene group is a $CH_2$ group.

* * * * *